(12) United States Patent
Le Besnerais

(10) Patent No.: US 8,729,750 B2
(45) Date of Patent: May 20, 2014

(54) STATOR ARRANGEMENT

(75) Inventor: Jean Le Besnerais, Mons en Baroeul (FR)

(73) Assignee: Siemens Aktiengesellschaft, Munich (DE)

( * ) Notice: Subject to any disclaimer, the term of this patent is extended or adjusted under 35 U.S.C. 154(b) by 114 days.

(21) Appl. No.: 13/439,146

(22) Filed: Apr. 4, 2012

(65) Prior Publication Data

US 2012/0256503 A1    Oct. 11, 2012

(30) Foreign Application Priority Data

Apr. 7, 2011    (EP) .................................... 11161520

(51) Int. Cl.
*H02K 9/00*    (2006.01)

(52) U.S. Cl.
USPC ............................................. 310/59; 310/52

(58) Field of Classification Search
USPC .................................... 310/52, 54, 58, 59, 64
See application file for complete search history.

(56) References Cited

U.S. PATENT DOCUMENTS

| | | | | |
|---|---|---|---|---|
| 4,395,816 A | * | 8/1983 | Pangburn | 29/598 |
| 5,869,912 A | * | 2/1999 | Andrew et al. | 310/52 |
| 6,376,945 B1 | * | 4/2002 | Fogarty | 310/58 |
| 2007/0024129 A1 | * | 2/2007 | Pfannschmidt et al. | 310/59 |

FOREIGN PATENT DOCUMENTS

| | | |
|---|---|---|
| CH | 87456 A | 12/1920 |
| CH | 648439 A5 | 3/1985 |
| JP | 2000050541 A | 2/2000 |

* cited by examiner

*Primary Examiner* — Nguyen N Hanh

(57) ABSTRACT

A stator arrangement for an electrical machine is provided. The stator arrangement has a stator having a stator stack. The stator stack has a number of adjacently disposed metal plates. A number of radial channels are provided between respective groups of metal plates by spacers. At least one transition area from the stator stack in at least one respective radial channel is provided with a curved and/or chamfered and/or stepped shape.

10 Claims, 2 Drawing Sheets

STATOR ARRANGEMENT

CROSS REFERENCE TO RELATED APPLICATIONS

This application claims priority of European Patent Office application No. 11161520.9 EP filed Apr. 7, 2011, which is incorporated by reference herein in its entirety.

FIELD OF INVENTION

The invention refers to a stator arrangement for an electrical machine, having a stator comprising a stator stack having a number of adjacently disposed metal plates, whereby a number of radial channels is provided between respective groups of metal plates by means of respective spacers.

BACKGROUND OF INVENTION

It is known that the operation of electrical machines such as generators or the like having a respective stator arrangement is accompanied by heat losses or copper losses respectively.

In order to avoid thermal overheating which would lead to lowered efficiency or even to damage or a reduction of the lifetime, particularly the insulation lifetime of the respective electrical machine, usually cooling means are provided with the stator arrangement.

Therefore, it is widely known to blow a gaseous cooling medium such as air along the stator stack and through respective radial channels between respective metal plates of the stator stack by means of fans.

The radial channels separating the groups of metal plates of the stator stack are usually provided by spacers. The spacers may be in the shape of additional metal sheets attached to respective metal plates of the stator stack or alternatively in the shape of so called pin point spacers disposed in between respective metal plates of the stator stack in order to build respective radial channels or radial channel-like structures.

Thereby, the problem of high pressure losses of the gaseous cooling medium has to be encountered within the radial channels. The pressure losses are mainly based on flow separation of the gaseous cooling medium and may significantly diminish the cooling performance.

SUMMARY OF INVENTION

Hence, it is the object of the present invention to provide a stator arrangement having improved cooling properties, particularly in regard of the pressure losses within the respective radial channels.

This is inventively achieved by a stator arrangement as has been initially described, wherein at least one transition area from the stator stack in at least one respective radial channel is provided with a curved and/or chamfered and/or stepped shape.

The present invention is based on the idea to provide the at least one transition area from the stator stack in at least one respective radial channel with an aerodynamic shape, i.e. the respective transition area has a curved and/or chamfered and/or stepped shape. In such a manner, the problem of pressure losses of the gaseous cooling medium in the respective radial channels serving as air-ducts is encountered. As a result, the cooling capability may be increased since the distribution of the flow rate of the gaseous cooling medium through the respective radial channels is improved, i.e. respective differences of the flow rate in axial and radial direction are essentially diminished leading to an essentially even distribution of the flow rate both in axial and radial direction, that is axially along the stator stack as well as radially through the respective radial channels.

Second, the inventive principal leads to an improved cooling efficiency since the reduction of the pressure losses within the radial channels also reduces the power for operating respective cooling fans.

Third, with the increase of the cooling efficiency it is possible to reduce the total number of respective radial channels in the stator stack if need be. Hence, the axial dimensions of the stator stack may be reduced as well leading to a more compact design of the stator with the at least same or an improved cooling capability.

In a cut view of the stator arrangement each radial channel has four respective transition areas, i.e. two transition areas at a radial outer position defining the respective radial channel in axial direction at the respective radial outer position and two transition areas at a radial inner position defining the respective radial channel at the respective radial inner position. Hence, it is possible to apply the inventive principle of providing a smooth transition from the stator stack in a respective radial channel to the left upper and/or left lower and/or right upper and/or right lower transition area.

The number of accordingly aerodynamically smoothed transition areas may depend on the relative axial location of the respective radial channel and consequently, the relative axial location of the respective transition areas from the stator stack in the respective radial channels with regard of the total axial length of the stator.

The shape of the respective transition area is particularly convex or concave curved and/or chamfered and/or stepped. All respective shapes of the respective transition areas lead to an improved flow of the gaseous cooling medium in and through the radial channels. The respective transition area may have partially different shapes, whereby the inventive principle of an aerodynamically optimised and smoothened transition area is considered.

According to an embodiment of the invention, at least one free ending of at least one of the respective metal plates next to the respective radial channel is provided with a curved and/or chamfered and/or stepped shape. Hence, at least one of the respective metal plates axially defining the respective radial channel has at least one accordingly shaped free ending. As has been mentioned above, respective hybrid shapes like both chamfered and stepped for instance are possible.

Regarding the stepped shape of the respective transition area it is preferred that it is provided by a respective reduction of the radial dimensions of at least one of the respective metal plates next to the respective radial channel. Hence, an easy way of realising an aerodynamically shaped transition area is obtained since merely the respective metal plate next to the radial channel, i.e. axially defining the respective channel has to be concertedly shortened in comparison to the metal plates building the stator stack giving rise to the respective stepped shape. Additionally, it is also possible that the respective free ending of the respective metal plate has a stepped shape comprising at least one step itself.

It is also possible that additionally at least one further metal plate being adjacently disposed to the at least one metal plate next to the radial channel has reduced radial dimensions, whereby the respective reduced radial dimensions of the at least one further metal plate lie between the radial dimensions of the stator stack and the radial dimensions of the respective metal plate next to the respective radial channel. In such a manner, the transition area may be further smoothened leading to a better flow profile of the gaseous cooling medium. The concrete number of the respective metal plate with reduced radial dimensions is arbitrary, whereby it is clear that high numbers of respective radially shortened metal plates lead to smoother transition areas.

For the same reason, it is preferred that the radial dimension of the respective at least one further metal plate and the metal plate next to the radial channel are gradually reduced.

It is of further advantage when the spacers have an aerodynamic shape. In such a manner, a further improved flow of the gaseous cooling medium through the stator of the generator is attainable. Respective aerodynamic shapes may control or direct a gas flow in a desired manner contributing to an improved cooling capability of the generator as a whole. Specific surface structures of the spacers may also be of advantage since they may also support proper conveyance of a gaseous cooling medium within the generator, that is especially the stator radial duct-like channels.

The aerodynamic shape of the spacers may be provided by a wedge-like or cone-like shape. The shapes are notably adapted to control or direct a gas flow. Nevertheless, other shapes of the spacers are applicable as well.

In another advantageous embodiment of the invention, the spacers are made of a thermally conductive material. Thus, the spacers may drag heat from the stator windings and the stator stack which additionally increases the cooling performance. Possibly, means for better transport of thermal energy such as heat transfer pastes or the like may be useful in addition.

Thereby, it is preferred that the thermally conductive material is a metal, in particular a copper-based metal. Metals usually comprise good thermal conductivities, that is have comparatively high coefficients of thermal conductivity and hence, contribute to good heat transfer behaviour of the spacers. Thereby, copper or copper alloys are in favour since they exhibit an outstanding heat conducting capability. It is understood that other materials having good heat conducting behaviour such as highly graphite filled polymers for instance are applicable as well.

The invention also refers to an electrical machine comprising a stator arrangement as described before. The electric machine is preferably used as a generator of a wind turbine, in particular a direct drive wind turbine. The wind turbine may be suitable for offshore applications.

BRIEF DESCRIPTION OF THE DRAWINGS

In the following, the invention is described in detail as reference is made to the figures, whereby.

DETAILED DESCRIPTION OF INVENTION

Figure 1:
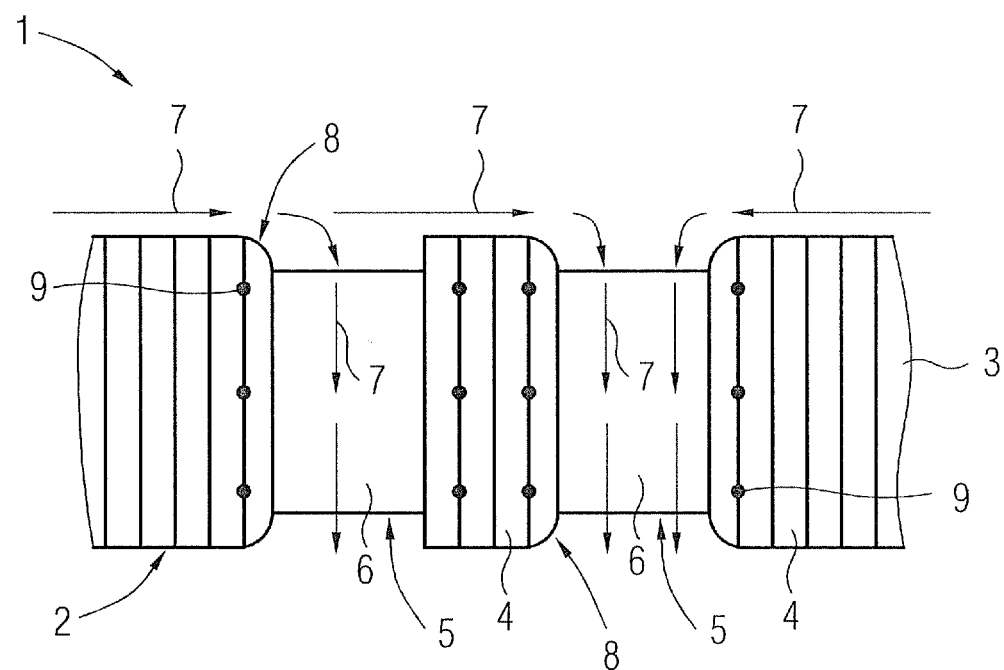
FIG. 1 shows a cut out view of a stator arrangement according to an exemplary embodiment of the invention.

FIG. 1 shows a cut out view of a stator arrangement 1 according to an exemplary embodiment of the invention. The stator arrangement 1 is part of an electrical machine (not shown) with an outer stator 2—inner rotor (not shown) configuration or an outer rotor—inner stator 2 configuration respectively. The electrical machine is preferably a generator of a direct drive wind turbine (not shown) suitable for offshore applications.

The stator arrangement 1 comprises the stator 2 with a stator stack 3 having a number of adjacently disposed metal plates 4. Radial channels 5 are provided between respective groups of metal plates 4 by means of respective spacers 6 at given positions along the axial length of the stator 2.

The stator 2 is cooled by air circulating along the stator stack 3 and through the respective radial channels 5 (cf. arrows 7). In order to improve the flow profile of the air, i.e. particularly reduce the pressure losses within the respective radial channels 5, the transition area 8 from the stator stack 3 in the respective radial channels 5 is provided with a convex curved shape. The convex curved shape allows a more aerodynamically air flow through the respective radial channels 5 leading to an increase of the cooling capability as well as the cooling efficiency since the respective pressure losses are significantly reduced. Generally, the transition area 8 may be defined by the area in which the direction of the air stream changes from essentially axial (horizontal) to radial (vertical) direction into the respective radial channels 5.

As is discernible, the aerodynamic shape of the respective transition areas 8 is provided by a respective convex curved shape of respective free radial endings of respective metal plates 4 next to the respective radial channels 5.

As is further discernible, not all respective metal plates 4 next to the respective radial channels 5 have respective radial free endings with a convex curved shape, i.e. the metal plate 4 defining the right side of the left radial channel 5 has normally shaped free radial endings in comparison to the metal plate 4 defining the left radial channel from the left side. With regard to the right radial channel 5, both respective metal plates 5 have accordingly convex curved free radial endings.

The respective metal plates 4 next to the respective channels 5, i.e. the respective metal plates 4 axially defining the respective radial channels 5 are slightly thicker in comparison to the remainder of the metal plates 4 building the stator stack 3. In such a manner, they are ready to be attached to the remainder of the metal plates 3 by means of welding (cf. welding points 9).

The respective spacers 6 are firmly attached to the respective metal plates 4 next to the respective radial channels 5 by means of welding for instance. The spacers 6 are preferably made of copper and also comprise an aerodynamically shape, i.e. cone-like shape which further improves the flow behaviour of the respective gaseous cooling medium, i.e. the air.

Figure 2:
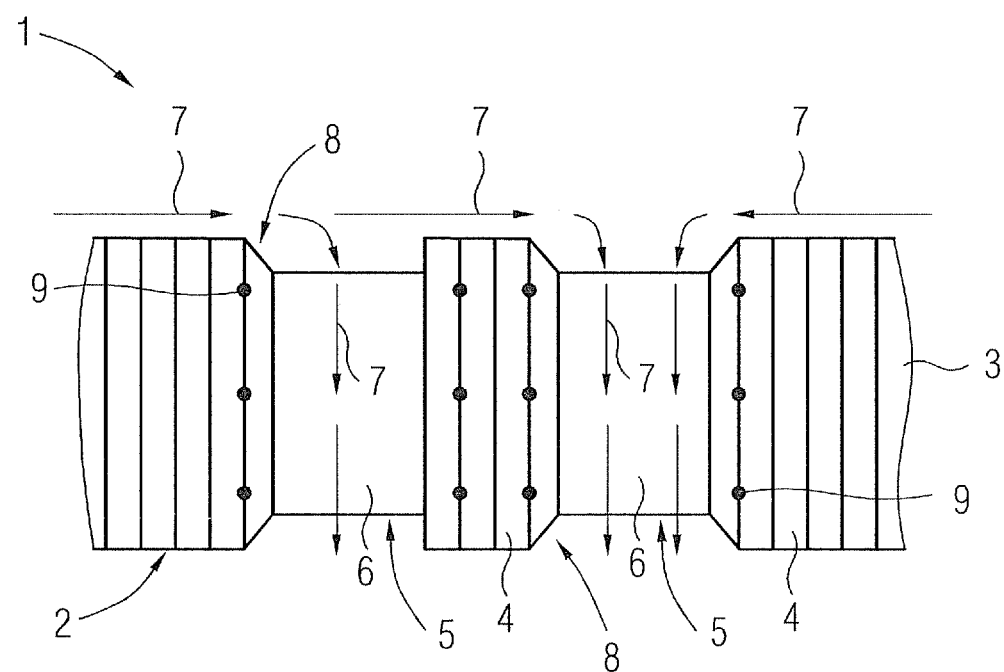
FIG. 2 shows a cut out view of a stator arrangement according to an exemplary embodiment of the invention.
Figure 3:
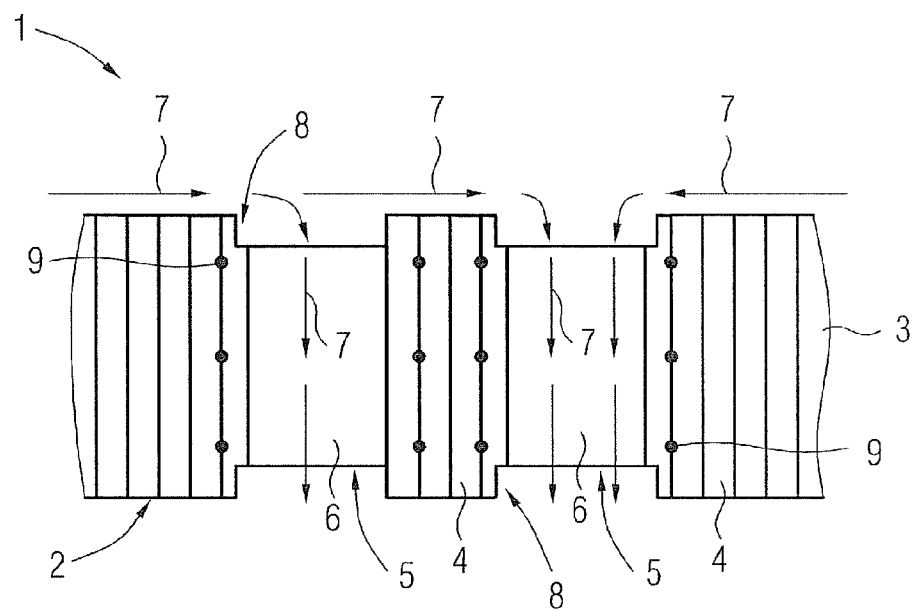
FIG. 3 shows a cut out view of a stator arrangement according to an exemplary embodiment of the invention.

The FIGS. 2, 3 show cut out views of stator arrangements 1 according to further exemplary embodiments of the invention. The essential difference to the embodiment shown in FIG. 1 lies in the shape of the respective free radial endings of the respective metal plates 4 next to the respective radial channels 5.

Thereby, FIG. 2 shows a chamfered shape of the respective free radial ending of the respective metal plates 4 next to the respective radial channels 5, whereas FIG. 3 shows a stepped shape of the respective radial free endings of the respective metal plates 4 next to the respective radial channels 5. In either case, the transition areas 8 from the stator stack 3 in the respective radial channels 5 is provided with an aerodynamic shape.

Figure 4:
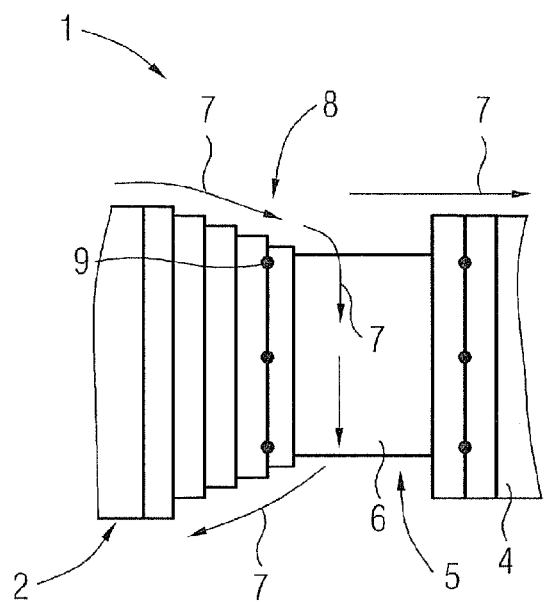
FIG. 4 shows a cut out view of a stator arrangement according to an exemplary embodiment of the invention.

FIG. 4 shows a cut out view of the stator arrangement according to an exemplary embodiment of the invention. In this embodiment, also a stepped shape of the respective transition area 8 is provided by a respective reduction of the radial dimensions of not only the respective metal plate(s) 4 next to the respective radial channel 5, but additionally by three further metal plates 4 being adjacently disposed to the respective metal plate(s) 4 next to the radial channel 5.

As is discernible, the respective reduced radial dimensions of the respective three further metal plates 4 lie between the radial dimensions of the stator stack 3 and the radial dimensions of the respective metal plate 4 next to the respective radial channel 5. The radial dimensions of the respective three further metal plates 4 are gradually reduced emanating from the stator stack 3 towards the metal plate 4 next to the respective radial channels 5. Likewise, a significant improvement of the air flow is obtained. The embodiment shown in FIG. 4 may require additional manufacturing efforts but it also increases the electromagnetic performances as the spacer may be electromagnetically used.

The invention claimed is:

1. A stator arrangement for an electrical machine, comprising:
    a stator comprising:
        a stator stack including metal plate groups, each metal plate group comprising a plurality of adjacently disposed metal plates; and
        a plurality of radial channels provided between respective metal plate groups by respective spacers,
        a transition area between at least one of the respective metal plate groups and the respective radial channel is provided in a stepped shape, the plurality of adjacently disposed metal plates of the at least one respective metal plate group includes a first plate and a second plate being adjacent to the first plate, the first plate is arranged next to the respective radial channel and the first plate is thicker in comparision to the second plate and the first plate is welded to the second plate.

2. The stator arrangement according to claim 1, wherein the first has a reduced radial dimension in the transition area in relation to the second plate.

3. The stator arrangement according to claim 2,
    wherein the plurality of adjacently disposed metal plates of the at least one respective metal plate group includes a third plate a being adjacent to the second plate,
    wherein the second plate has a reduced radial dimension in the transition area in comparison to the third plate.

4. The stator arrangement according to claim 3, wherein the reduced radial dimension of the first plate and the reduced radial dimension of the second plate are gradually reduced.

5. The stator arrangement according to claim 1, wherein the spacers comprise an aerodynamic shape.

6. The stator arrangement according to claim 1, wherein the spacers are made of a thermally conductive material.

7. The stator arrangement according to claim 6, wherein the thermally conductive material is a copper-based metal.

8. The stator arrangement according to claim 1, wherein the electrical machine is a generator.

9. An generator for a wind turbine, comprising:
    a stator arrangement according to claim 1.

10. The generator as claimed in claim 9, wherein the wind turbine is a direct drive wind turbine.

* * * * *